United States Patent [19]

Ni

[11] Patent Number: 5,618,451
[45] Date of Patent: Apr. 8, 1997

[54] HIGH CURRENT PLASMA ARC WELDING ELECTRODE AND METHOD OF MAKING THE SAME

[76] Inventor: Jian M. Ni, 75 Springbrook Drive, Richmond Hill, Ontario, Canada, L4B 3R3

[21] Appl. No.: 391,968

[22] Filed: Feb. 21, 1995

[51] Int. Cl.$^6$ .......................... B23K 10/02; B23K 35/02
[52] U.S. Cl. ................. 219/121.53; 219/121.53; 219/119; 219/145.31; 219/145.23
[58] Field of Search ................. 219/121.52, 121.48, 219/121.53, 145.23, 118, 119, 145.31

[56] References Cited

U.S. PATENT DOCUMENTS

| | | | |
|---|---|---|---|
| 1,709,474 | 4/1929 | Hawley, Jr. ................. | 219/119 |
| 3,555,239 | 1/1971 | Kerth ........................... | 219/125 |
| 3,620,830 | 11/1971 | Kramer ........................ | 219/146 |
| 4,190,760 | 2/1980 | Kano et al. ................... | 219/128 |
| 4,958,060 | 9/1990 | Mankins et al. ............. | 219/119 |

*Primary Examiner*—Mark H. Paschall
*Attorney, Agent, or Firm*—David W. Wong

[57] ABSTRACT

The elongated welding electrode is for plasma arc welding. It has a welding flux material coated on an elongated metal core. Gaps are formed in the flux coating and located at even intervals along the entire length of the electrode. The ratio of the melting points of the flux coating material and the metal core is in the range of 0.9 to 1.05. The ratio of the weights of the flux coating material and the metal core is in the range of 1.1 to 2.5. The electrode may be used with a simple welding gun and a large welding current to produce the plasma effect for welding without having to use an additional supply of gas for shielding the molten weld metal and for cooling the slag.

6 Claims, 2 Drawing Sheets

HIGH CURRENT PLASMA ARC WELDING ELECTRODE AND METHOD OF MAKING THE SAME

BACKGROUND OF THE INVENTION

This invention relates to welding electrodes and particularly relates to an elongated welding electrode suitable for plasma arc welding with a relatively simple welding gun.

In a welding operation, a plasma phenomenon occurs at the welding point in which a portion of the front end of a consumable welding electrode and the immediate area of of the material being welded are transformed into a fluid state. The molten metal in this fluid state subsequently solidified to form the weld metal. In order to achieve a high degree of plasma phenomenon, a welding energy density of $10^5$ to $10^6$ watts per square centimeter (w/cm$^2$) must be provided whereas only an energy density of $10^3$ to $10^4$ w/cm$^2$ can only be provided in the common welding operation. Theoretically energy density can be increased by reducing the cross sectional size of the welding electrode to a small size such that the welding energy is concentrated within a small surface area. However, due to the high temperature which is normally over 4000° C. generated in the welding operation, a small size electrode and flux coating material thereon would become molten instantly without the formation of a plasma arc required to produce a high quality weld. Accordingly, such method is not feasible.

Heretofore, the most successful method of producing a large plasma arc is by injecting a shielding gas at the welding area through a nozzle provided at the front end of the welding apparatus. The gas, supplied from a compressed gas tank, forms a shield around the front end of the welding apparatus to assure the formation of the plasma arc and it also provides the cooling function of the molten portion of the welding electrode and the immediate area of the welding object to form the solidified weld metal. The main drawback of such method is that the nozzle of the welding apparatus often quickly breaks down due to the exposure to the extremely high welding temperature. Moreover, the construction of the nozzle is complex and since it is critical to assure a precise amount of gas is provided to without causing an incompatible amount of the compressed gas to mix with the plasma arc so as to result in the formation of irregular welds. Furthermore, since the melting of the weld metal and the production of the plasma arc cannot be produced with a single current simultaneously, it is necessary to supply separate currents for providing these functions. Still furthermore, in order to assure the production of a large plasma arc, a large amount of compressed gas must be provided at the welding area. This requires the introduction of separate feeding channels in the welding apparatus wherein one channel is for delivering the electrode to the welding area, and the other channel is for delivering the compressed gas thereto. The use of such compressed gas in the high temperature welding environment presents potential safety and fire hazards. For the above reasons, the construction of the welding apparatus becomes very complex and it is extremely costly to fabricate in order that it can provide the numerous functions demanded by the operation.

SUMMARY OF THE INVENTION

The above disadvantages of the present plasma arc welding are obviated by the unique welding electrode construction of the present invention so that it is not necessary to use a compressed gas for shielding. The welding electrode, in operation, automatically produces a large amount of plasma arc.

The principal object of the present invention is to provide a welding electrode which inherently forms a shielding nozzle at its front tip during the welding operation to facilitate the formation of a large amount of plasma arc.

Another object of the present invention is to provide an elongated welding electrode which has a plurality of contact points along its length to facilitate the supply of a large current to the welding electrode to produce a large plasma arc.

It is yet another object of the present invention to provide an elongated welding electrode which may be used by simple welding apparatus to produce a large plasma arc.

It is yet another object of the present invention to provide an elongated welding electrode which facilitates the production of a large plasma arc without the use of compressed gas shielding.

Briefly, the elongated welding electrode of the present invention comprises an elongated metal core coated with a welding flux coating. A plurality of gaps are formed at even intervals in the welding flux coating along the entire length of the electrode. Each gap exposes a portion of the metal core such that a large welding current can be supplied to the metal core through a plurality of such gaps. The ratio of the melting point of the flux coating to that of the metal core is in the range of 0.9 to 1.05, and the ratio of the weight of the flux coating to that of the metal core is in the range of 0.9 to 1.1. Also, the distance between adjacent ones of the gaps is in the range of 20 mm to 40 mm.

BRIEF DESCRIPTION OF THE DRAWINGS

Other objects and advantages of the present invention will become apparent from the following detailed description in connection with the accompanying drawings, in which.

DETAILED DESCRIPTION OF THE PREFERED EMBODIMENTS

Figure 1:
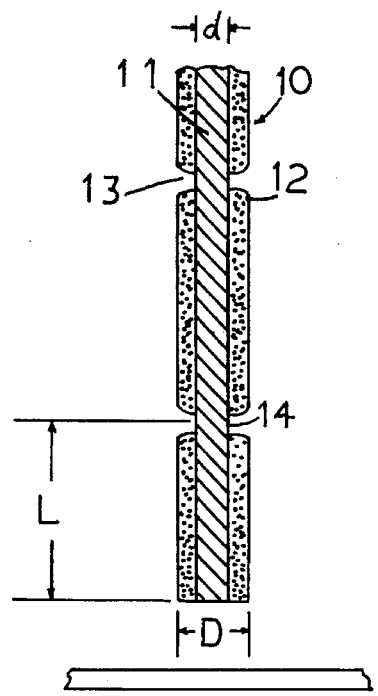
FIG. 1 is a perspective cross sectional side elevation view of the welding electrode according to the present invention.

With reference to the drawings, the welding electrode 10 has an elongated metal core 11 having a flux material 12 coated over its external surface along its entire length. Gaps 13 are formed at even intervals along the entire length of the electrode such that a narrow portion 14 of the metal core surface is exposed in each gap to facilitate the supply of the welding current through a plurality of such gaps 13 to the metal core 11. As shown in FIG. 1 the metal core 11 has a diameter d; the outside diameter of the electrode is D; the distance between the mid point of adjacent gaps is L.

Figure 2:
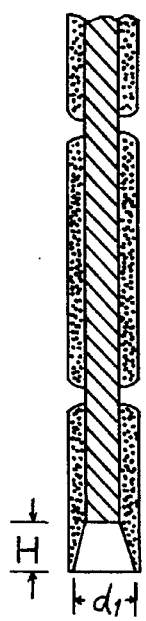
FIG. 2 is a perspective cross sectional side elevation view of the formation of a shield at the front end of the welding electrode of the present invention during the welding operation.
Figure 3:
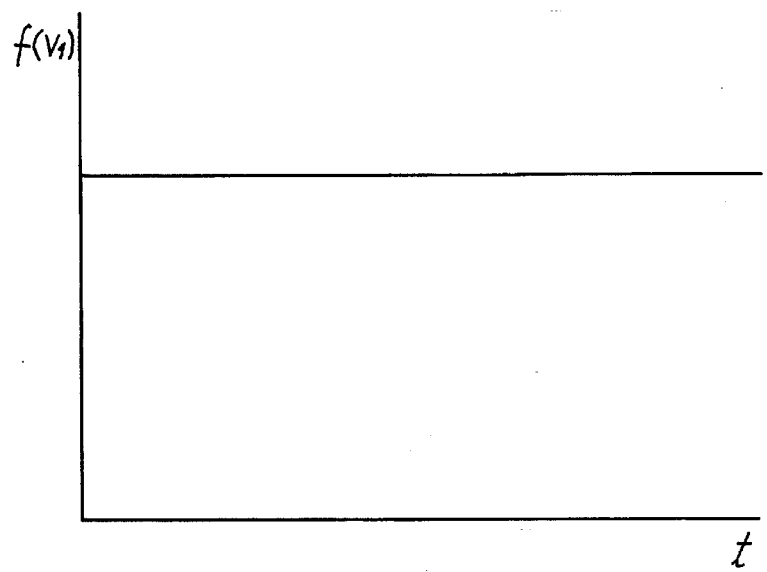
FIG. 3 is a graph showing the melting speed of the metal core of a common welding electrode versus time.

To illustrate the present invention, if the welding current is $I_f$, and the weight of the metal core is $G_1$, while the weight of the flux coating is $G_2$, and $K_1$ and $K_2$ represent the melting points of the metal core and the flux coating material respectively. In common arc welding operation, in order to obtain a consistant weld under a steady supply of a welding voltage, the melting speed $f(v_1)$ of the metal core is a flat horizontal line as shown in FIG. 2 which shows that the metal core is melting at a constant speed. The melting speed $f(v_2)$ of the flux material coating 12 is affected by two factors. The first factor is that the melting speed of the flux material is dependent upon the formulation of such material. The melting point $K_2$ of the flux coating 11 varies according to proportions of minerals, metal alloy, silica and organic matters in the formulation of the flux coating material. The second factor is the weight $G_2$ of the flux coating material 12, which directly affects its melting speed. Due to the differentiation of the the melting speeds of the metal core 11 and the flux coating material 12 a depression would automatically formed at the front end of the electrode during the welding operation. As shown in FIG. 3, the length or depth of such depression is H, and the end diameter of the depression $d_1$. I have discovered that a maximum length H from $(1.1$ to $2.5)d_1$ of depression is formed when the metal core and flux coating material have the following characteristics:

The melting point $K_2$ of the flux material coating is equal to $(0.9$ to $1.05)$ times the melting point $K_1$ of the metal core, i.e. the ratio of the melting point of the flux material coating to that of the metal core is 0.9 to 1.05, while the weight $G_2$ of the flux material coating is $(0.9$ to $1.1)$ times the weight $G_1$ of the metal core, i.e. the ratio of the weight of the flux material coating to that of the metal core is 0.9 to 1.1.

When the flux material coating and the metal core have the above characteristics, the differentiation of the melting speeds of the flux material coating and the metal core produces the desirable depression by the flux material coating layer to a form a shield at the front end of the welding electrode during the welding operation.

Figure 4:
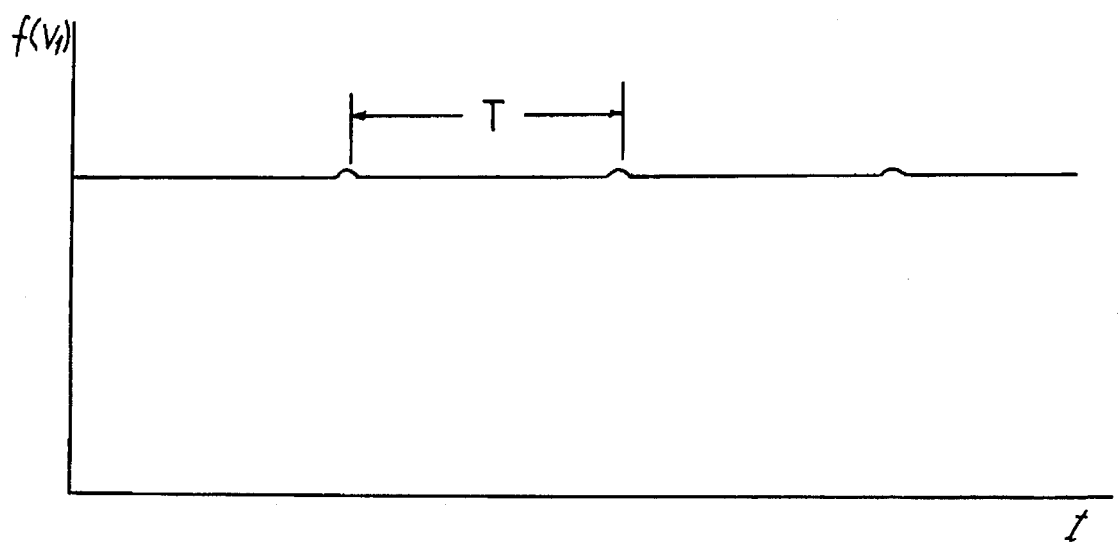
FIG. 4 is a graph showing the melting speed of the metal core of a welding electrode of the present invention having a diameter of 1.4 mm.
Figure 5:
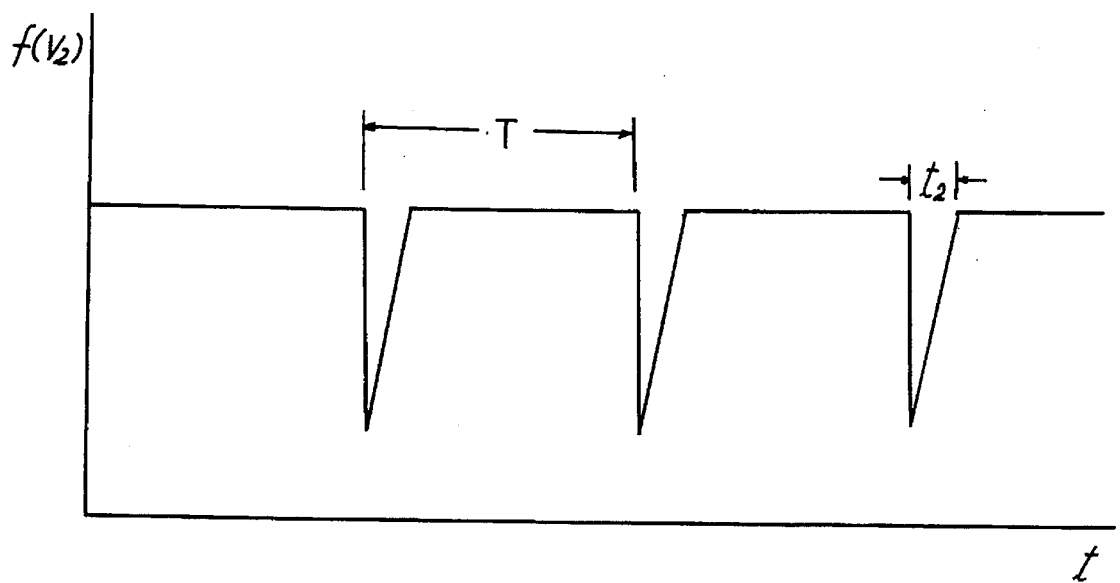
FIG. 5 is a graph showing the melting speed of the flux coating of a welding electrode of the present invention having a diameter of 1.4 mm.

For example, for a welding electrode having a diameter of 1.4 mm, and the welding voltage $V_f$ of 60 volts is applied with a welding current $I_f$ of 200 amperes, the melting speed $f(v_1)$ of the metal core is shown in the graph of FIG. 4, while the melting speed $f(v_2)$ of the flux material coating is shown in the graph of FIG. 5. In these graphs, the period T varies according to the distance between the gaps 13 in the welding electrode; the period $t_2$ is the time period of the formation of the depression shield. The differentiation of the two curves is as follows:

$$H = \left( \int_0^t f(v_1)dt - \int_0^t f(v_2)dt \right) t t/T = 2.6 \text{ mm}$$

which is about 1.05 times the diameter $d_1$ of the electrode. The result is verified in actual operation.

According to the above teaching, a depression shield having a depth or length equal to $(1.1$ to $2.5)d_1$ is consistently formed at the tip of the electrode such that a large plasma arc is formed within the shield without the additional provision of an external shielding gas, as long as the metal core and the flux material coating have the above indicated characteristics. If the depression shield is too small, it would cause the plasma to scatter from the weld, whereas if the depression shield is too long, the metal core would melt erratically.

In practice, with a 1.4 mm diameter welding electrode having the distance between the adjacent gaps in the flux coating in the range of 20 mm to 40 mm and a welding voltage $V_f$ equal to 60 volts and a welding current $I_f$ of 200 amperes a welding energy density of the following amount can be obtained with the use of a simple welding gun:

$$\begin{aligned} p &= V_f I_f/S = 4V_f I_f/\pi d^2 \\ &= 4 \times 60 \times 200/[3.14 \times (1.8 \times 10^{-1})^2] \\ &= 4.8 \times 10^5 \text{ W/cm}^2 \end{aligned}$$

which provides the necessary energy to produce the plasma arc for making a good quality weld without the additional use of an external shielding gas. Accordingly, the welding electrode and method of the present invention can be used with a welding apparatus having a simple constrution to produce a high quality weld.

Obviously, numerous modifications and variations of the present invention are possible in light of the above teachings. It is therefore to be understood that within the scope of the appended claims, the invention may be practiced otherwise as specifically described herein.

What I claimed is:

1. An elongated welding electrode suitable for plasma arc welding comprising, an elongated metal core provided with an outer welding flux coating, a plurality of gaps formed at even intervals in said welding flux coating along the entire length of said electride, each gap of said plurality of gaps exposing a portion of said metal core therein and being operative for applying a welding current directly to said metal core, said flux coating being made of a welding flux material having a melting point in the range of 0.9 to 1.05 times of the melting point of said metal core.

2. An elongated welding electrode according to claim 1 wherein the weight per unit length of said flux coating is in the range of 0.9 to 1.1 times of said metal core in the same unit length.

3. An elongated welding electrode according to claim 2 wherein the distance between adjacent gaps of said plurality of gaps is in the range of 20 mm to 40 mm.

4. An elongated welding electrode suitable for plasma arc welding comprising an elongated metal core having an entire outer surface coated with a welding flux material coating, said elongated welding electrode having an overall diameter of from 1.0 mm to 2.0 mm, a plurality of transverse gaps formed in said welding flux material coating, said gaps extending from the peripheral surface of the electrode to said metal core and exposing portions of said metal core therein and being operative for a welding current to be applied therethrough directly to said metal core, and said gaps being formed at an equal distance along the entire length of said welding electrode, said welding flux material coating having a weight per unit length in the range of 0.9 to 1.1 times the weight per the same unit length of said metal core, said welding flux material coating having a melting point equal to 0.9 to 1.05 times the melting point of said metal core, the distance between adjacent gaps of said welding flux material coating being in the range of 20 mm to 40 mm.

5. A method of making a plasma arc welding electrode comprising, coating a welding flux material coating over the surface of an elongated metal core, said welding flux material coating being chosen from a welding flux material having a melting point in the range of 0.9 to 1.05 times the melting point of said metal core, and a weight per unit length in the range of 0.9 to 1.1 times the weight per the same unit length of said metal core, forming a plurality of transverse gaps at equal intervals in said flux material coating along the entire length of said metal core, said gaps extending from the peripheral surface of the electrode to said metal core whereby a portion of said metal core is exposed in each one of said gaps.

6. A method of making a plasma arc welding electrode according to claim 5 wherein the interval between adjacent gaps is in the range of 20 mm to 40 mm.

* * * * *